United States Patent [19]

Mucic et al.

[11] Patent Number: 5,004,043

[45] Date of Patent: Apr. 2, 1991

[54] INTERNAL TUBULAR FALLING FILM APPARATUS FOR THE EVAPORATION OF LIQUIDS AND FOR THE ABSORTION OR DEGASSING OF SOLUTIONS OF TWO OR MORE SUBSTANCES

[75] Inventors: Vinko Mucic, Walldorf; Kurt Thieme, Bergisch-Gladbach; Jürgen Engelmann, Overath-Steinenbrüch, all of Fed. Rep. of Germany

[73] Assignee: TCH Thermo-Consulting-Heidelberg GmbH, Heidelberg, Fed. Rep. of Germany

[21] Appl. No.: 274,932

[22] PCT Filed: Mar. 17, 1988

[86] PCT No.: PCT/EP88/00217

§ 371 Date: Nov. 2, 1988

§ 102(e) Date: Nov. 2, 1988

[87] PCT Pub. No.: WO88/07653

PCT Pub. Date: Oct. 6, 1988

[30] Foreign Application Priority Data

Mar. 24, 1987 [DE] Fed. Rep. of Germany ....... 3709652

[51] Int. Cl.$^5$ .......................... F28D 3/04; F28D 3/02
[52] U.S. Cl. .................... 165/118; 159/13.2; 159/43.1; 165/115; 261/153
[58] Field of Search ............. 165/115, 118, 174; 159/13.2, 43.1; 261/153

[56] References Cited

U.S. PATENT DOCUMENTS 3,132,064  5/1964  Scheffer ........................ 159/13.2
4,567,942  2/1986  Stafford et al. ................... 165/118

FOREIGN PATENT DOCUMENTS 77139     7/1919  Austria ........................... 159/13.2
1102702   3/1961  Fed. Rep. of Germany ..... 159/13.2
46-41601  8/1971  Japan ............................. 159/13.2
1255849   9/1986  U.S.S.R. ......................... 165/118

*Primary Examiner*—Martin P. Schwadron
*Assistant Examiner*—Allen J. Flanigan

[57] ABSTRACT

Apparatus (10) for the evaporation of liquids or for the absorption or degassing of two-substance or multi-substance solutions of the interior tube falling film type of construction, with a pressure tank (12) through which a heat exchanging medium can pass, whose interior contains a plurality of vertical parallel tubes (22) set apart from one another which open in a bell (26; 24) placed on the bottom and on the top of the pressure tank, the upper ends of the tubes projecting above the upper side of the top place of the pressure tank. On the upper bell (24) there is provided an inlet (36) for the liquid or solution, and a connection (38) for the input or output of evaporated liquid or gaseous solution component, and on the bottom bell there is provided an outlet (34) for liquid or liquid solution.

At a distance above the mouths of the tubes (22) a dividing plate (42) is inserted into the bell, which has a plurality of bores (44) of small diameter. At a distance above this dividing plate (42) an additional dividing plate is inserted into the bell (24) and the interstice formed between the two dividing plates and connected to the inlet (36) for the liquid or liquid solution component is filled with a number of vertical tubes (54) carried through perforations in the dividing plates, the said vertical tubes being aligned with the mouths of the tubes (22) passing through the pressure tank.

6 Claims, 9 Drawing Sheets

INTERNAL TUBULAR FALLING FILM APPARATUS FOR THE EVAPORATION OF LIQUIDS AND FOR THE ABSORPTION OR DEGASSING OF SOLUTIONS OF TWO OR MORE SUBSTANCES

The invention relates to an apparatus for the evaporation of liquids and for the absorption or degassing of solutions of two or more substances, having a completely enclosed, upright pressure tank provided with at least one inlet and one outlet for a thermal-transfer fluid, whose interior contains a plurality of parallel vertical tubes spaced apart from one another, whose ends are sealingly brought through a horizontal plate closing the bottom end of the pressure tank and one closing the top of same, such that they open into a bell disposed hermetically on the pressure tank at the bottom and at the top, the upper ends of the tubes projecting into the bell by the same amount above the upper side of the horizontal top plate and in the upper bell an inlet is provided for liquid or solution and a connection is provided for the entry and removal of evaporated liquid or gaseous solution component, and in the bottom bell an outlet is provided for liquid or liquid solution, and at a distance above the upper ends of the tubes and below the inlet for the liquid or solution a dividing plate parallel to the upper horizontal plate of the pressure tank is inserted into the upper bell chamber, through which passes a plurality of holes of small diameter offset from the mouths of the tubes.

Known apparatus of this kind, disclosed in DE-AS 1,121,588, serve for example for the concentration by evaporation of liquids, such as milk or fruit juices, which are to be concentrated by evaporating a portion of their moisture content. In such apparatus a uniform distribution to the descending tubes of the liquid that is to be concentrated is important to the achievement of optimum concentration. Falling-stream evaporators of similar construction designed for the concentration of sugar-beet juice are also known in the sugar industry through German Federal Gebrauchsmuster 19 92 031.

When such apparatus are used as evaporators or as resorbers or degassers in compression heat-pump systems, the liquid or solution entering the upper chamber collects on the upper horizontal plate of the pressure tank where it forms an overflowing pool of a depth corresponding to the height of the tubes running through the pressure tank above the upper horizontal plate. From there the liquid or solution passes into the mouths of these tubes and then falls by gravity in a thin film on the tubes' inner surfaces into the bottom chamber. Depending on the temperature of the fluid flowing through the pressure tank, heat is transferred through the wall of the vertical tubes to the liquid film or is removed therefrom and thus either evaporates liquid from the film or degasses the solution, or, due to the cooling, simultaneously absorbs gaseous solution components flowing through the tubes. On the basis of the above-described special configuration and operation, these apparatus are also referred to as "internal tube falling film apparatus." In the apparatus used in connection with compression heat pump systems, the liquid or solution passes from the chamber inlet directly into the overflow pool. On account of the flow thus developing in the overflow pool an irregular overflow into the tube mouths occurs, which results in different film thicknesses in the individual tubes and thus irregular evaporation or degassing or absorption in the individual tubes and thus a lower efficiency. Furthermore, in evaporators or degassers in which the evaporated liquid or the gaseous component driven out of the solution is sucked upward against the flow of the film, the danger also exists that liquid or liquid solution in the form of droplets or fog will be carried into the compressor unless a liquid trap precedes the compressor.

It is therefore the purpose of the invention to improve the known apparatus in regard to the entry of the liquid or solution into the overflow pool such that the overflow from the pool into the tubes passing through the pressure tank will take place in an absolutely uniform manner, so that a film flowing on the inner walls of the tubes will be obtained which will have the same thickness in all tubes. In the case of evaporating or degassing applications, it is also to be brought about that no liquid components will be contained in the gaseous component driven out of the solution or evaporated from the liquid, such as might damage a compressor that has n liquid trap.

Setting out from an apparatus of the kind mentioned above, this purpose is accomplished by the fact that an additional separating plate is inserted into the chamber at a distance above the perforated separating plate and above the liquid or solution inlet and below the connection for the admission or removal of evaporated liquid or gaseous component of a solution, and that the space formed between the perforated plate and the additional separating plate contains a number of vertical tubes aligned with the tubes passing through the pressure tank, whose ends are sealingly brought through the lower perforated plate and the upper additional dividing plate. The liquid or solution therefore no longer flows—as in the case of the above-described evaporators for the concentration of juices or milk—directly from the inlet of the chamber into the overflow pool, but first gathers on the perforated separating plate above it where it forms a quieting pool, while the liquid or solution enters into the overflow pool through the plurality of holes which are provided in the separating plate and which are deliberately offset as regularly as possible from the mouths of the falling-film tubes. The liquid or solution thus flows in thin streams which do not give rise to any turbulent eddies in the overflow pool, so that to this extent a uniform overflow of the liquid or solution from the overflow pool into the mouth of the tubes passing through the pressure tank is assured. The gaseous component driven out of the solution and sucked upwardly when the apparatus is used as an evaporator or degasser furthermore emerges from the upper mouths of the vertical tubes passing through the pressure tank and sealingly through the lower and upper additional separating plate, directly into the bottom openings aligned with them, i.e., it is hermetically separated from the quieting pool, thus avoiding any entrainment of liquid or liquid solution in the form of droplets or mist into a compressor.

In a preferred further development of the invention, an impermeable cylinder is disposed substantially parallel with and at a slight distance from the inner surface of the chamber and is sealingly placed on the upper side of the lower perforated separating plate. Its height is lower than the height of the interstice between the two separating plates, and no bores are provided in the lower separating plate area between the inside surface of the chamber and the outside surface of the cylinder. The liquid introduced into the annular chamber formed above the annular area must therefore first flow over the upper edge of the cylinder into the actual quieting pool formed above the perforated area of the lower separating plate. The passage of the liquid or solution stream over the upper edge of the annular wall and down to the quieting pool has the consequence that even in the quieting pool the formation of eddies that might lead to an uneven thickness of the streams flowing over into the overflow pool is prevented.

If the apparatus in accordance with the invention is to be used as an absorber or resorber—in a heat pump system, for example—i.e., the gaseous solution component that is to be resorbed in the solution inside of the falling-film tubes is fed from the upper end of the bell through the tubes passing through the space between the separating plates, the configuration is best made such that the tubes passing through the space between the separating plates provided in the upper bell have a diameter that is smaller than the inside diameter of the mouths of the tubes projecting above the top horizontal plate, and that the tubes passing through the bell interstice are carried through the lower perforated separating plate into the mouths of the tubes projecting from the top horizontal plate which are aligned therewith. This achieves a distribution of the gaseous component in the equal amount associated with the solution films flowing in the individual tubes, thereby achieving the desired equalization of the absorption. In comparison to the blowing of the gaseous solution component into the space above the overflow pool, the direct introduction of the gaseous component into the mouths of the falling-film tubes has the advantage that no disturbance of the surface of the overflow pool can be produced by the flow of the gaseous component.

When the apparatus in accordance with the invention is to be used as a degasser or evaporator, i.e., when the gaseous solution component driven out in the falling-film tubes or evaporated at the upper end of the bell is aspirated by a compressor, the tubes passing through the space between the separating plates can best terminate flush with the bottom separating plate. Solvent component is already outgassing to a certain extent from the solution in the quieting pool, or in the other case liquid is evaporating from it. Consequently it is desirable to provide the upper bell with an additional outlet in its area directly beneath the upper separating plate, which will be connected by a pipeline to an additional connection on the bottom bell. The solution component outgassed from the quieting pool (or the evaporated liquid) is thus sucked down into the bottom bell and then passes upwardly countercurrently to the falling film of solution through the tubes passing through the pressure tank. This aspiration of the gaseous solution component driven from the solution in the upper bell also produces the result that within the falling-film tubes, liquid solution that has passed into the gaseous component is separated out again in the form of small and minuscule drops by the effect of gravity. The gaseous solution component that is aspirated is therefore largely free of liquid solution, so that the liquid trap necessary in the known apparatus can be either completely eliminated or replaced by liquid traps of lesser capacity.

To minimize the entrainment of liquid solution in the form of droplets from the liquid solution flowing into the mouths of the vertical tubes and from the liquid solution passing in the form of thin streams from the holes of small diameter into the space between the separating plate and the horizontal plate into the connection carrying away gaseous solution component, and with it the danger of the segregation of liquid in a compressor, the configuration, in an advantageous further development of the invention, can be such that the holes of small diameter provided in the separating plate lead at their bottom into closely adjacent pipe nipples which in turn sealingly lead into a opening in an additional horizontal separating plate disposed between the separating plate and the top horizontal plate of the pressure tank just above the plane of the upper ends of the vertical tubes projecting above the top horizontal plate, and this additional horizontal separating plate is provided in turn with through-openings in line with the mouths of the vertical tubes. The free admission cross section of these through-openings is slightly smaller than the free admission cross section of the vertical tubes and the through-openings are bordered each by a collar protruding from the separating plate into the mouth of each associated vertical tube.

In the use of the apparatus it may be desirable under certain operating conditions to make the degasser or evaporator or the resorber a two-stage or multi-stage apparatus in order to improve the performance rating of the heat pump. These special operating conditions exist when the actual temperature difference and the desired temperature difference is very different on the heat-source and useful-heat sides. If, for example, the allowable lowering of the temperature in the heat-transfer fluid taken from the heat source for the degassing is small in comparison to the desired elevation of the temperature in the heat-carrying medium carrying the useful heat from the resorber, it is desirable to make the degasser a two-stage or multi-stage degasser and to place a throttling means in the solution circuit of each degasser stage to lower the pressure step-wise in the degasser stages, and to associate with each degassing stage either a separate compressor or one or more stages of a multistage compressor for the individual raising of the pressure to the same end pressure of the component driven in gaseous form out of the solution and carried to the resorber, the degasser stages being connected parallel in regard to their flow with the heat carrying medium supplied from the heat source. If on the other hand the desired or allowable temperature elevation in the heat carrying medium to be carried out of the resorber is low in comparison to the possible lowering of the temperature of the heat carrying fluid in the degasser, which is supplied by the heat source, it is desirable to make the resorber a two-stage or multistage resorber and connect a solution pump to the input of each resorber stage in the solution circuit, by which the pressure in the resorber stages is increased step-wise, and to connect to the output of each resorber stage either a separate compressor or one or more stages of a multistage compressor in which the component driven out of the solution in gaseous form in the degasser is compressed to the individual pressure of the particular resorber stage, while the resorber stages are connected in parallel in regard to their flow with the heat carrying medium which carries the resorption energy as useful energy from the resorber. In applications, therefore, in which the degassing or evaporation, or the absorption (resorption), takes place in two or more stages at two or more different pressure levels, the apparatus in accordance with the invention can advantageously be so constructed that, in the upper and lower bells at least two absorption or degassing systems sealed hermetically against one another and operating at the different pressure levels are disposed concentrically to one another such that the system operating at a low pressure level concentrically surrounds the system operating at a higher pressure level.

The invention is further explained in the following description of several embodiments, in conjunction with the drawings, wherein.

Figure 1:
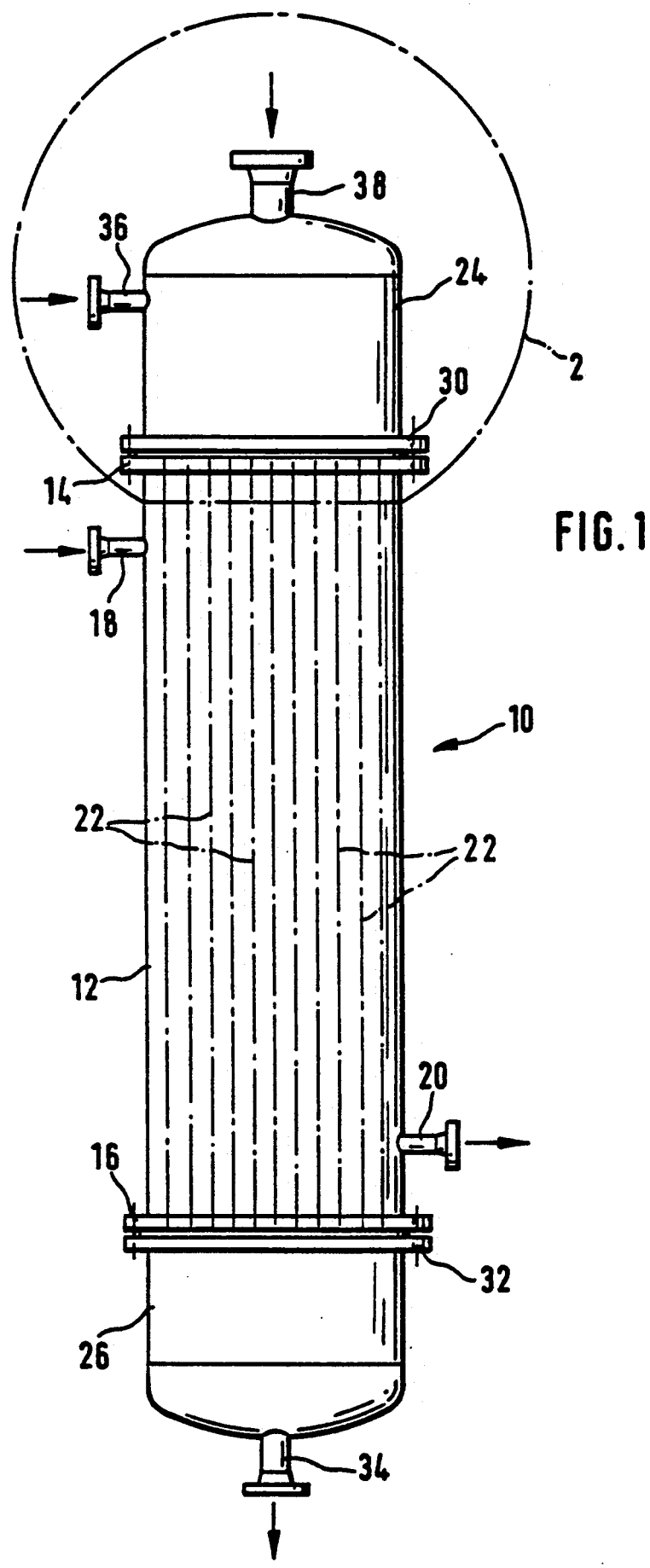
FIG. 1 is a side view of a first embodiment of the apparatus in accordance with the invention designed as a single-stage resorber in a two-substance heat pump system.
Figure 2:
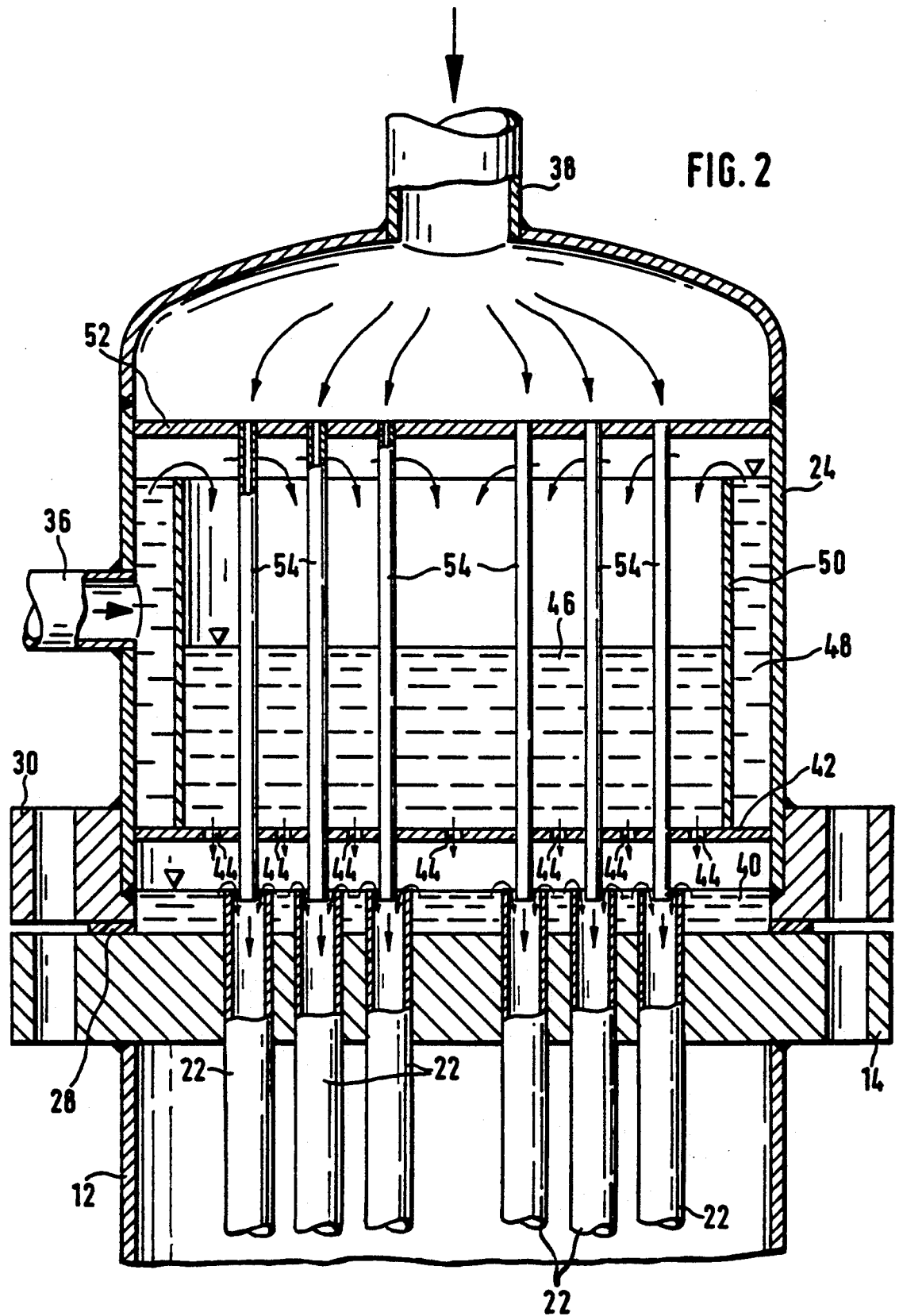
FIG. 2 is a longitudinal central section of a detail of the upper part of the apparatus situated within the area 2 marked off by the broken line.

The embodiment of the apparatus in accordance with the invention shown in FIGS. 1 and 2 is the resorber, identified as whole by the number 10, such as can be used, for example, in a two-substance compression heat pump, for the purpose of resorbing (reabsorbing) into a poor solution, which has been raised to a higher pressure by a pump, a gaseous solvent component which has previously been driven out of a rich solution with heat at a relatively low temperature level in a degasser (to be further described in conjunction with FIGS. 3 and 4) and has been raised to a higher pressure by a compressor with the removal of heat.

For this purpose the apparatus 10 has an elongated cylindrical upright pressure tank 12 which is hermetically closed off at top and bottom by a plate 14 and 16 respectively and has an inlet 18 as well as an outlet 20 through which a fluid can enter and exit, respectively, which [fluid] absorbs the heat released upon the reabsorption of the gaseous component in the poor solution and thus becomes heated. The interior of the pressure tank 12 contains a great number of parallel, vertical tubes 22 spaced apart from one another, which are indicated by broken lines in FIG. 1. In FIG. 2, however, it can be seen that the upper ends of the tubes 22 are brought sealingly through the upper plate 14. In like manner, the bottom ends of the tubes 22 are to be understood to be brought sealingly through the bottom plate 16. On the top and bottom ends of the tank 12 are sealingly placed the bells 24 and 26 whose mouths face the plates 14 and 16, respectively; the outer marginal areas of the plates 14 and 16, which are of greater diameter than the tank 12, serve simultaneously as flanges which can be bolted to annular flanges 30 and 32 welded to the bells 24 and 26, respectively. The bottom bell 26 serves as a collecting chamber for the two-substance solution which emerges through the outlet 34 re-enriched after the resorption of the gaseous solution component.

The poor solution is fed into the apparatus 10 through an inlet 36 attached laterally to the upper bell, and the gaseous solution component is fed through a connection 38 provided centrally on the top of the bell 24.

The upper ends of the tubes 22 project above the surface of the upper plate 14 by a certain amount in the manner seen in FIG. 2, so that within the bell 24 an overflow pool 40 of poor solution fed onto the upper plate from the inlet 36 can form. From this pool the poor solution can enter into the mouths of the tubes 22 and then flow down in a thin film on their inner walls to the lower bell 26 only when its level rises above the height of the ends of the tubes 22. In addition, the gaseous solution component flows from a compressor, not shown, through the connection 38 into the bell 24 and downwardly through the tubes 22, in the same direction as the poor solution, and is reabsorbed in the poor solution. The reabsorption heat thus developed is transferred through the walls of tubes 22 into the fluid flowing through the pressure tank 12, whose temperature is thus raised to a level which enables it to be useful energy.

To assure a uniform overflow of the poor solution from the pool 40 into the tubes 22 and accordingly the formation of a uniform film thickness and rate of flow of the poor solution within the tubes 22, as well as a uniform distribution and feeding of the gaseous solution component into the tubes 22, thus improving the efficiency of the apparatus, the configuration is made such that the poor solution does not flow directly out of the inlet 36 into the pool 40. Instead, a horizontal separator 42 is inserted into the bell above the pool 40 and below the inlet 36, and contains a plurality of bores 44 which are disposed in a very uniform pattern with respect to the mouths of tubes 22, the bore pattern being selected such that the bores 44 are offset from the mouths of tubes 22. The diameters of the bores 44 are deliberately made so small that a second poor-solution pool 46, to be known as a "quieting pool," forms, out of which the poor solution passes into the overflowing pool 40 in thin streams which cannot producing eddying or agitation of the overflow pool 40. The poor solution, however, does not flow directly out of the inlet 36 into the quieting pool 46, but first flows into an annular chamber 48 which is formed by the inner surface of the wall of the bell 24 and the outside surface of a cylinder 50 sealingly placed on the separator 42 and separated by a distance from the bell 24. The separator 42 is closed in the area of the annular chamber 48, i.e., it has no holes there, so that the poor solution fed through the inlet 36 can only flow over the top edge of the cylinder 50 into the quieting pool 46 in which, again, no eddies can form, which promotes the formation of very equal streams passing through the bores 44 into the overflow pool 40

The gaseous solution component fed in through connection 38, again unlike the state of the art, is not blown freely into the bell 24; instead, an additional separator 52 is used at a distance above the inlet 36 and above the upper edge of the cylinder 50, and the space formed between this separator 52 and the bottom, bored separator 42, is filled with a number of tubes 54 aligned with the tubes 22, and their diameter, at least in the area of their bottom ends passing through the bottom separator 42 into the open mouths of tubes 22 is slightly less than the inside diameter of the tubes 22. The gaseous solution component is dosed into tubes 22 through tubes 54, and its direct introduction into the mouths of the tubes prevents the surface of the overflow pool 40 from being stirred up by jets of gaseous solvent components.

It has been found that the above-described configuration results in stable operation of the resorber with a high degree of efficiency, which is attributed to the absolutely uniform feeding of the poor solution and the formation of uniform film thicknesses in tubes 22, as well as the uniform and, if correctly designed, precisely measured feed of the gaseous solvent component directly into tubes 22.

Figure 3:
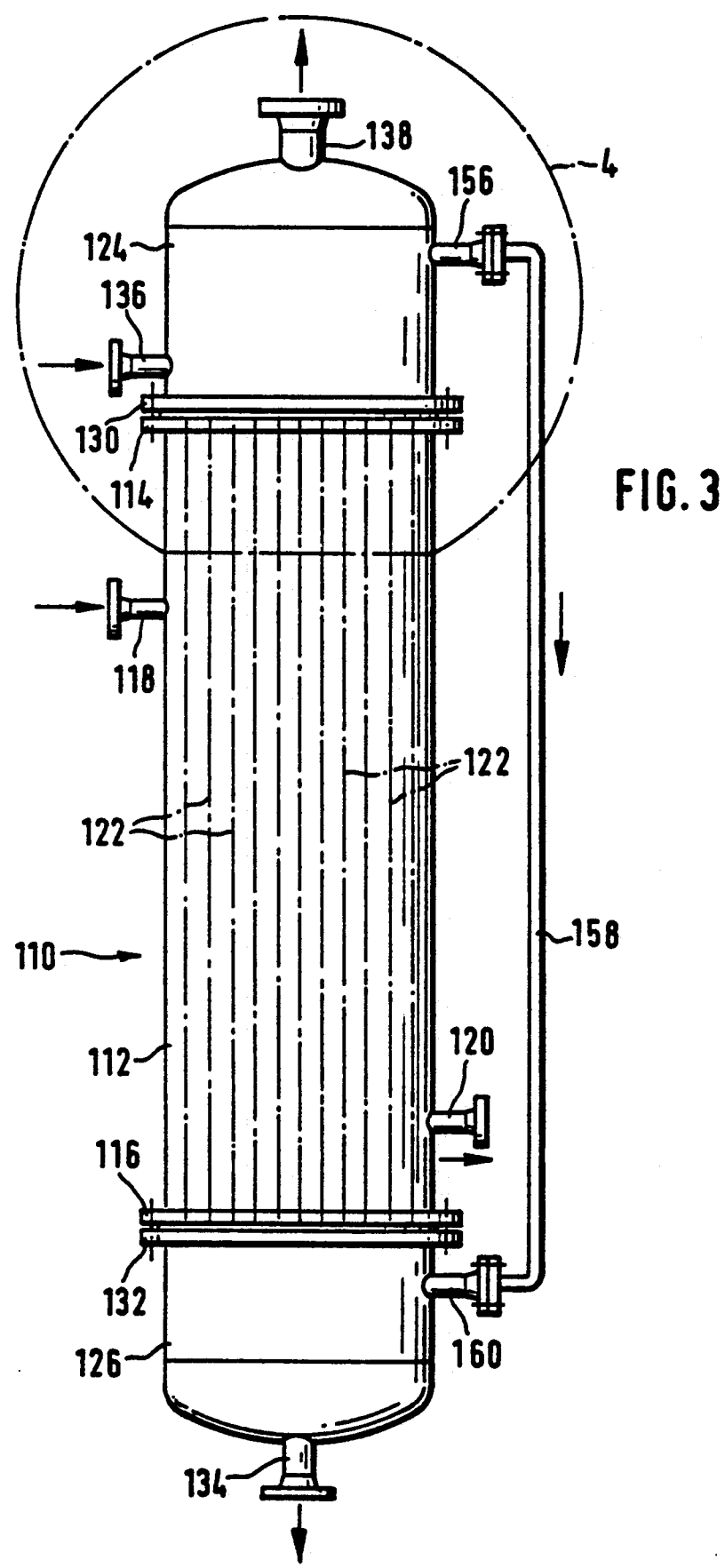
FIG. 3 is a side view of a second embodiment of the apparatus in accordance with the invention designed as a single-stage degasser in a two-substance heat pump system.
Figure 4:
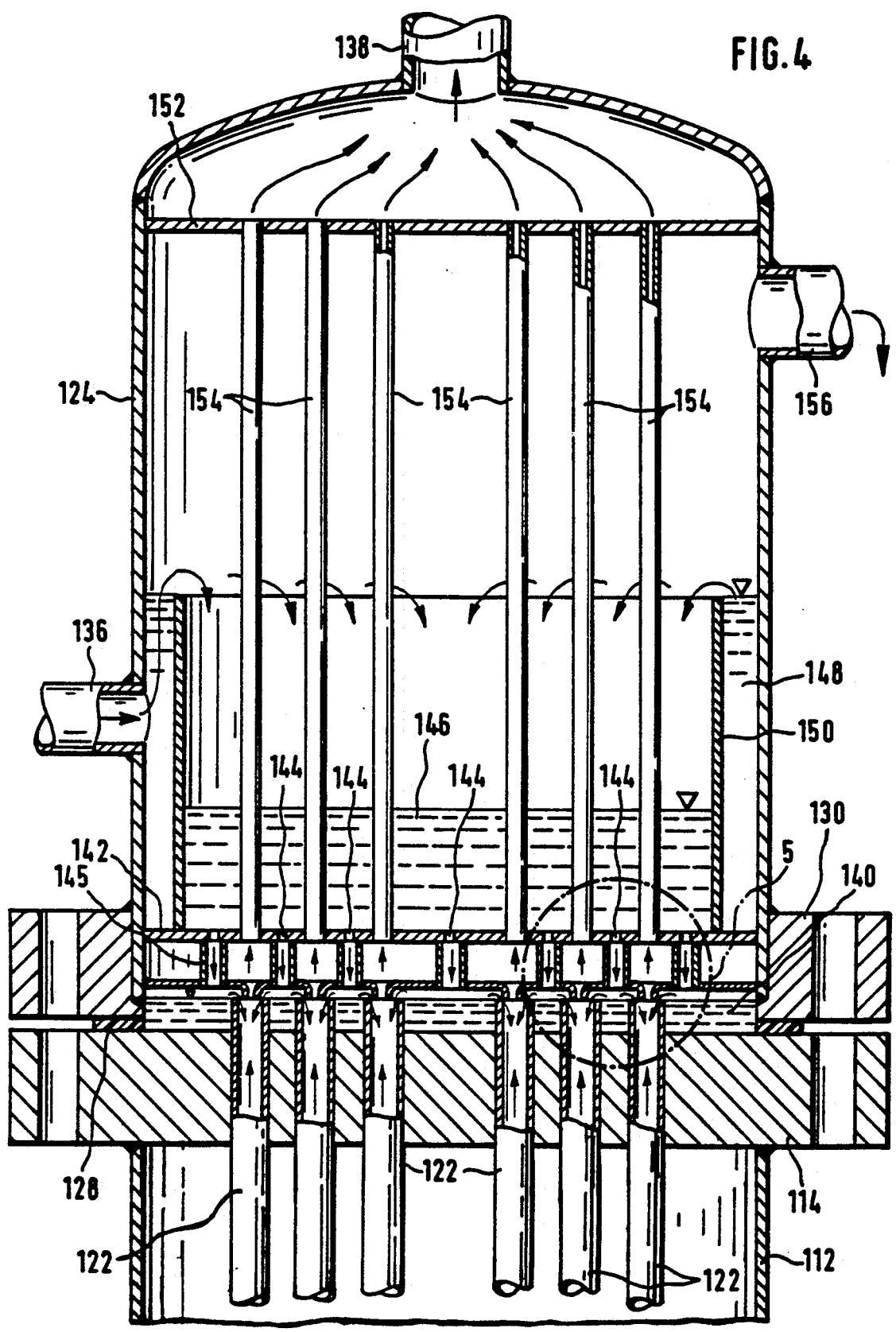
FIG. 4 is longitudinal central section of the upper part of the apparatus of FIG. 3 situated within the are 4 marked off by the broken line.

FIGS. 3 and 4 show an embodiment of the apparatus in accordance with the invention, identified as 110, which is configured as a degasser designed for use in the two-substance compression heat pump, for which the apparatus 10 described above in conjunction with FIGS. 1 and 2 and serving as a resorber is also intended. Since apparatus 110 and apparatus 10 are of substantially similar construction except for the modifications responsible for the functional differences, and comparable components of both apparatus are associated with the same reference numbers in the drawings, except that a "1" is prefixed in the case of the degasser 110, only the differences essential to the function plus any additional working parts will be described, while otherwise it suffices to refer to the preceding description of apparatus 10.

In degasser 110, gaseous components are driven out of the rich solution fed through inlet 136 into the bell 124 and into the tubes 122 with the input of heat from the fluid flowing through the pressure tank 112, and in this case it is aspirated from the connection 138 by the compressor of the heat pump. The gaseous solution component flows in tubes 122 therefore countercurrently to the solution that is becoming increasingly poorer toward the bottom bell 126. Poor solution, therefore, then passes out of the outlet 134 and is pumped with simultaneous pressure increase to the inlet 36 of the apparatus 10. One difference between the apparatus 110 and apparatus 10, that can be seen especially in FIG. 4, is that, due to the greater height of the space between the separators 142 and 152 and between the top edge of the cylinder 150 and separator 152, the bell 124 has a greater internal volume into which, to a certain extent, gaseous solution component is already outgassing from the rich input solution and is aspirated through an outlet 156 provided just underneath the separator 152 in the wall of the bell 124 and a duct 158 (FIG. 3) into an additional connection 160 provided on the bottom bell 126, into the said bottom bell. This part of the gaseous solution component is then aspirated from the bell 126 through the tubes 122 together with the gaseous solution component being there driven out, and through the connection 138.

In the examination of FIG. 4, another striking difference from the configuration of apparatus 10 is that, because the gaseous solution component is flowing in the opposite direction, the bottom end sections of tubes 154 do not project beyond the bottom separator 142 but terminate flush with this separator.

Figure 5:
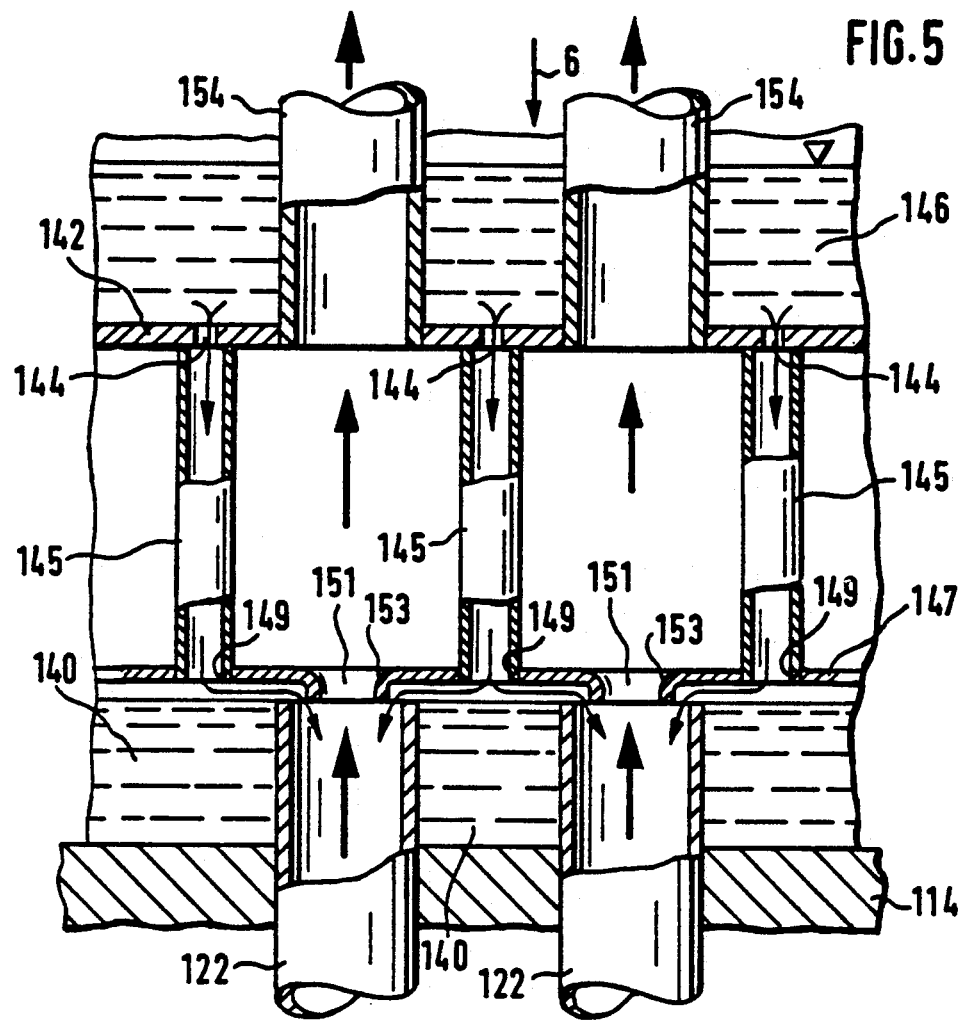
FIG. 5 is an enlarged representation of the portion of the apparatus of FIG. 4 situated within the area 5 marked off by the broken line.
Figure 6:
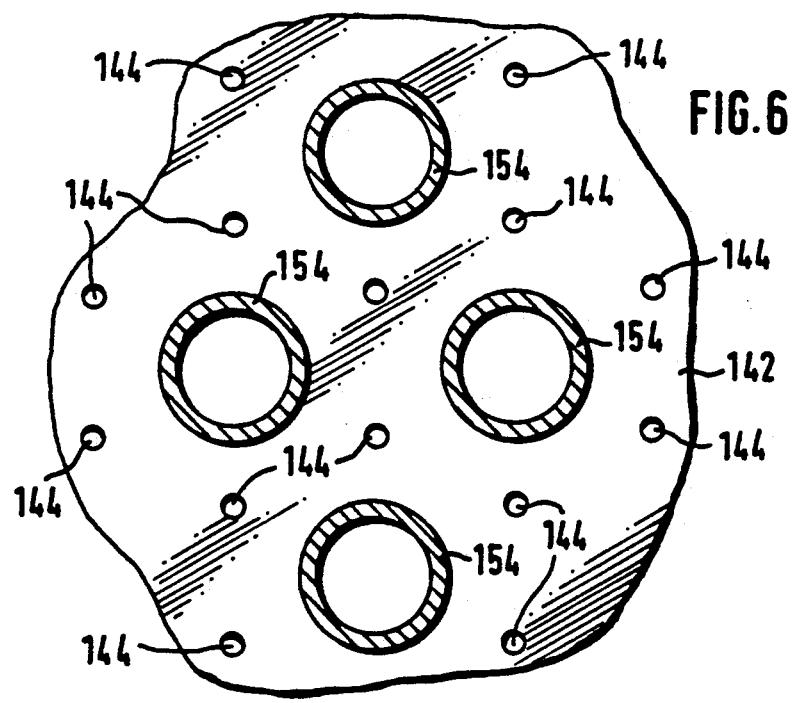
FIG. 6 is a view seen in the direction of the arrow 6 in FIG. 5.

As it can be seen especially in FIGS. 5 and 6, another difference from the apparatus 10 is that the bores 144 through which the liquid solution flows into the pool 140 from the quieting pool 145 do not lead freely into the space between the separator 142 and the top plate 114 of the pressure tank 112, but into nipples 145 sealingly connected to the bottom of the separator, which extend to openings 149 in a horizontal separator 147 disposed directly above the ends of the vertical tubes 122, and thus just above the surface of the overflow pool 140. Openings 151 are punched through the horizontal separator 147 in line with the mouths of the vertical tubes 122 such that each opening has a collar 153 formed all around it and projecting into the mouth of the corresponding vertical tube 122, and the outside diameter of the collar is less than the inside diameter of the mouth of the associated tube 122, so that the liquid solution can thus pass from the overflow pool 140 into the corresponding tube 122 through the annular gap remaining between the collar and the tube mouth. It is apparent that, through this configuration the entrainment of liquid solution component in the form of fine droplets from the space between the plate 114 and the separator 147 is prevented, so that the insertion of a liquid trap between the degasser and a compressor is avoided, or at least the size of such a trap is considerably reduced.

In FIGS. 7 to 10 are shown further developments of the apparatus described in connection with FIGS. 1 to 4, which have basically the same construction and also the same manner of operation as the above-described apparatus 10 and 110, but are of a two-stage configuration, i.e., can replace two apparatus 10 or 110 operating in series at different pressure levels. Since in this case again, parts having equal functions are provided in the drawing with the same reference numbers as in the previously described apparatus, only the pertinent modifications and further developments will be described below, the letter "a" being added to the numbers of parts of the low-pressure stage, and the letter "b" to parts of the high-pressure stage.

Figure 7:
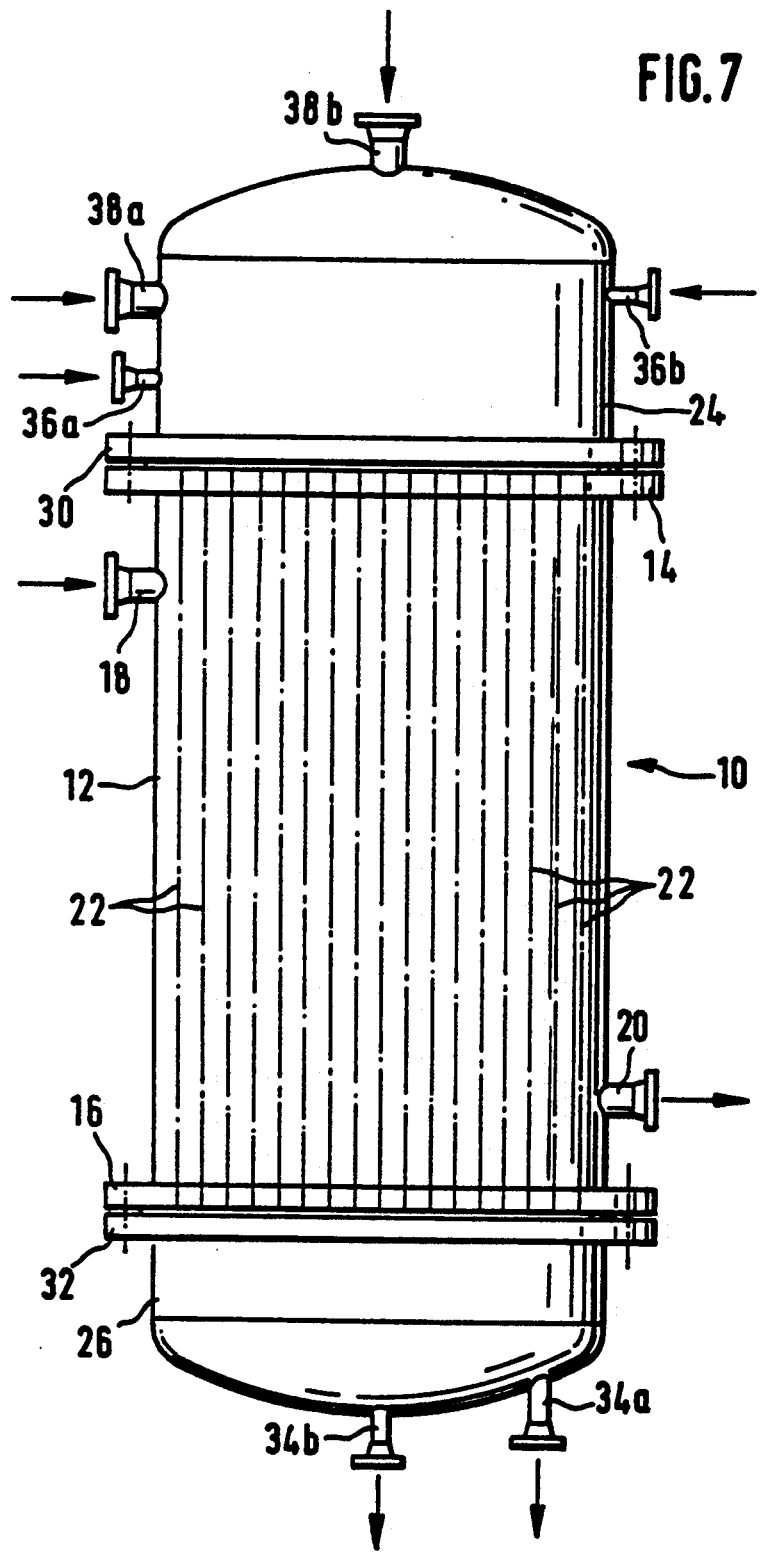
FIG. 7 is a side view of a third embodiment of the apparatus in accordance with the invention, designed as a two-stage resorber in a two-substance heat pump system.
Figure 8:
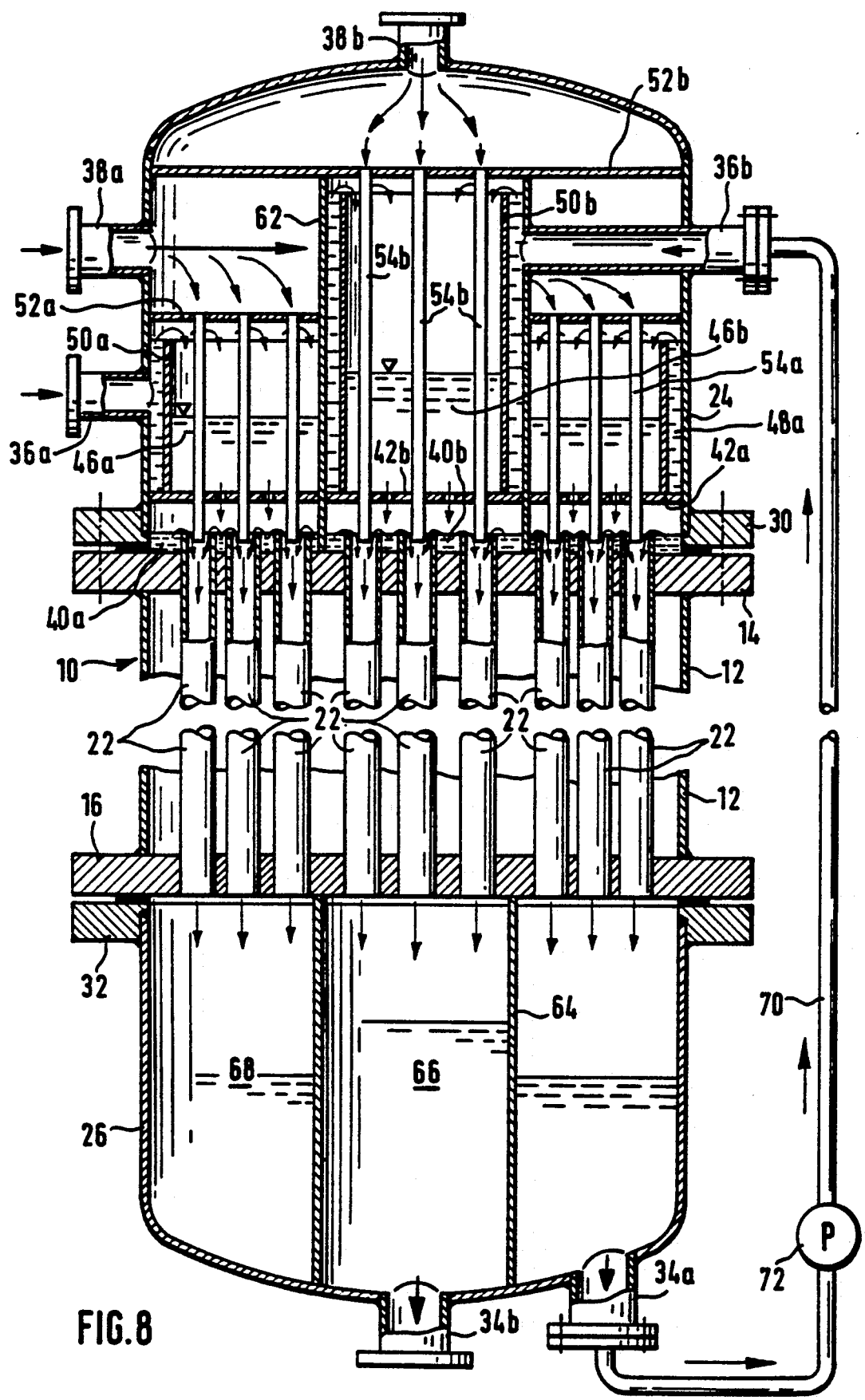
FIG. 8 is a longitudinal central section through the two-stage resorber shown in FIG. 7.

In FIGS. 7 and 8 is shown an apparatus 10 that can be used as a resorber, which, as seen in FIG. 7, differs externally from the single-stage apparatus 10 shown in FIGS. 1 and 2 only in the doubling of the inlets 36a and 36b for poor solution, connections 38a and 38b for gaseous solution component, and outlets 34a and 34b for rich solution. The changes in the internal construction are shown in FIG. 8. In the upper bell 24, two separators 52a and 52b are provided, which are at different levels, the lower of which, 52a, associated with the low-pressure stage, is set at the level between the inlet 36a and the connection 38a and, unlike the upper separator 52b of circular shape, has in plan, not a solid circular configuration, but a flat annular configuration with a central, circular opening. Inside of this circular opening a cylinder 62 is inserted into the bell 24 and rests sealingly with its bottom end on plate 14 of pressure tank 12 and extends upwardly to the separator 52b to which it is also joined sealingly. The lower, perforated separator is accordingly divided by the cylinder 62 into two concentric separator sections of which separator section 42b lying within the cylinder 62 has the shape of a flat ring with a diameter corresponding to the free inside diameter of the cylinder 62, while the outer separator section 42a is of a flat annular shape like the separator 52a.

In FIG. 8 it can be seen that the low-pressure inlet 36a and the low-pressure connection 38a are connected to the low-pressure system formed between the outer surface of the cylinder 62 and the inner surface of the bell 24, and the inlet 36b and connection 38b are connected to the high-pressure system formed within the cylinder 62.

In the bottom bell 26 there is also a cylinder 64 running from the bottom surface of the separator 16 to the inner surface of the domed bottom end of the bell, and thus divides the bell into a central cylindrical high-pressure chamber 66 and an outer annular low-pressure chamber 68 concentrically surrounding the high-pressure chamber. The outlet 34a for the rich solution formed in the low-pressure stage is accordingly connected to the low-pressure chamber 68 and the outlet 34b for the rich solution formed in the high-pressure stage is connected to the high-pressure chamber 66.

It can then also be seen in FIG. 8 that the rich solution forming in the low-pressure stage is pumped from the outlet 34a through a line 70 by inserted pump 72, with simultaneous pressure increase, into the inlet 36b.

Figure 9:
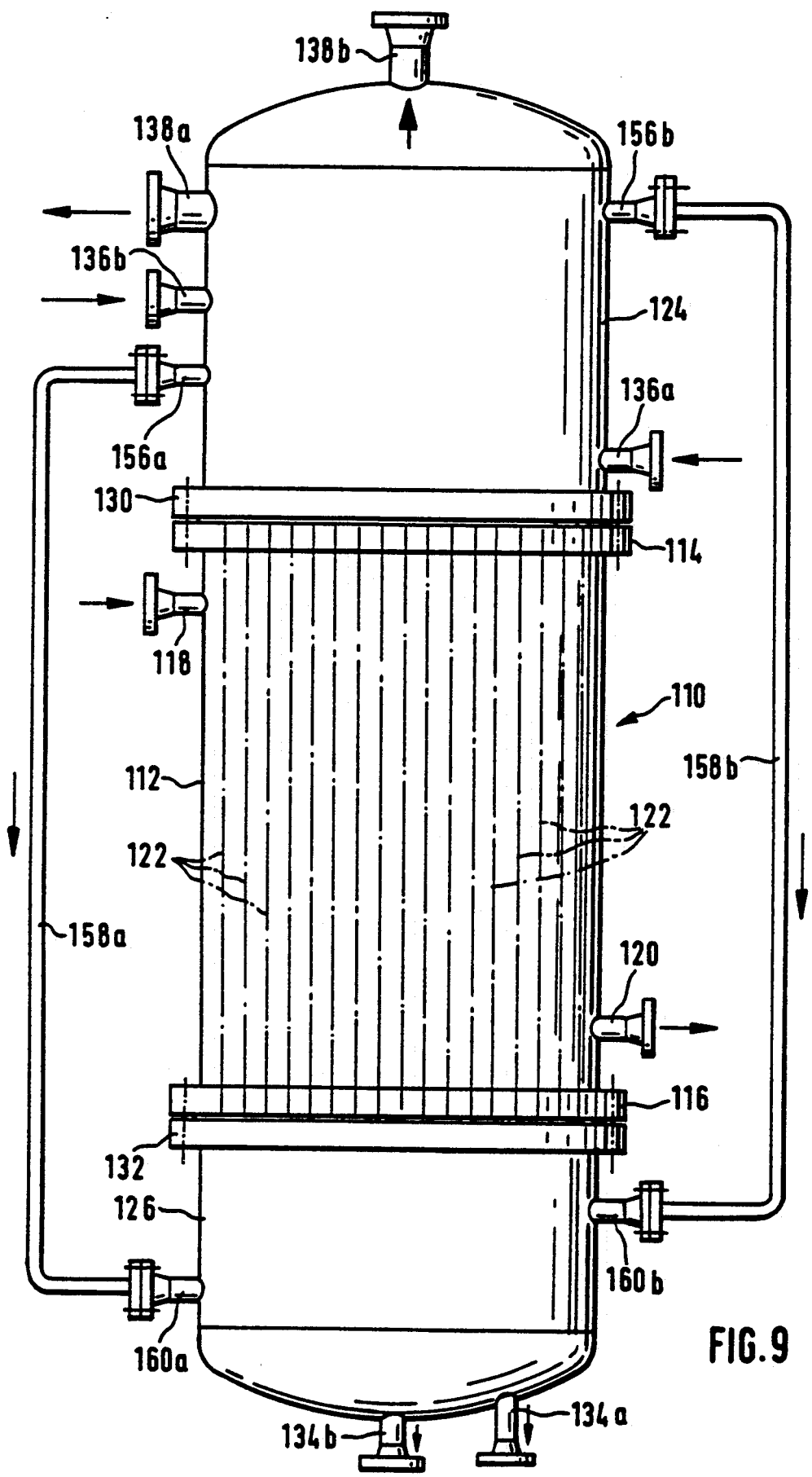
FIG. 9 is a side view of a fourth embodiment of the apparatus in accordance with the inventiondesigned as a two-stage degasser in a two-substance heat pump system.
Figure 10:
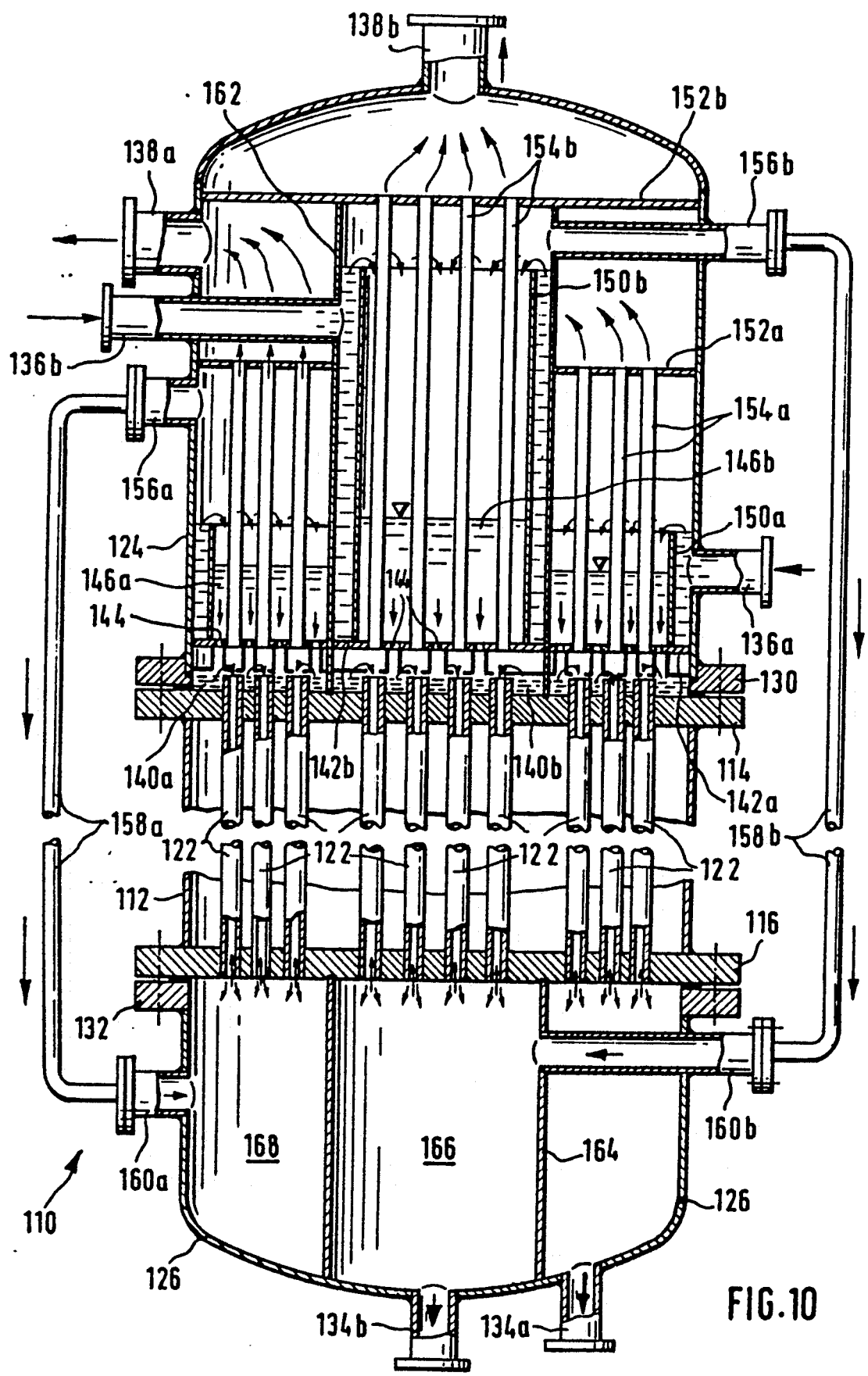
FIG. 10 is a longitudinal central section through the two-stage apparatus shown in FIG. 9.

Lastly, in FIGS. 9 and 10 is shown the two-stage configuration of a two-stage apparatus 110 operated as a degasser, in which the two stages of different working pressure are formed in the same manner as in the two-stage apparatus 10 of FIG. 8, by a cylinder 162 in the upper bell 124 and a cylinder 164 in the lower bell 126. The outlets and inlets for poor solution, gaseous solution component and rich solution are again arranged as in the two-stage apparatus 10, with provisions made for the fact that their operation is different in comparison to the resorber.

It is apparent that, within the scope of the invention, additional modifications and further developments of the described embodiments are possible. For example, with the appropriate modification of the apparatus shown in FIGS. 5, 6, 7 and 8, apparatus which can be used also as resorbers or degassers can be created with three or, if necessary, even more pressure stages disposed concentrically one inside the other. Instead of being used as resorbers (absorbers) and degassers in two-substance systems, they can also be used as condensers and evaporators in single-substance compression heat pump systems, operating, for example, with fluorocarbons (Frigene) as the working medium.

We claim:

1. Apparatus for the evaporation of liquids or for the absorption or degassing of solutions of two or more substances, having a completely closed upright pressure tank provided with at least one inlet and one outlet, through which tank a thermal transfer fluid can flow, the interior of the tank containing a plurality of vertical tubes parallel to and spaced from one another whose ends are brought sealingly through horizontal plates closing off the pressure tank at the bottom and at the top such that they open into a bell disposed in a pressure-tight manner on the bottom and top of the pressure tank, the upper ends of the tubes protruding into the bell each by the same amount above the upper side of the top horizontal plate and an inlet for liquid or solution being provided on the upper bell plus a connection for the infeed and outfeed of evaporated liquid or gaseous solution component, and an outlet for liquid or liquid solution being provided on the bottom bell, while at a distance above the upper mouths of the tubes and below the liquid or solution inlet a dividing plate parallel to the top plate of the pressure tank is inserted into the upper bell and contains a plurality of perforations of small diameter offset from the mouths of the tubes, characterized in that, at a distance above the perforated dividing plate (42; 142) and above the inlet (36; 136) for the liquid or solution, and below the connection (38; 138) for feeding in or carrying away evaporated liquid or gaseous solution component, an additional dividing plate (52; 152) is inserted into the bell (24; 124), and that the space formed between the perforated dividing plate and the additional dividing plate contains a number of vertical tubes (54; 154) aligned with the tubes passing through the pressure tank, whose ends are brought sealingly through the lower perforated dividing plate and the additional upper dividing plate.

2. Apparatus in accordance with claim 1, characterized in that, on the upper side of the lower perforated dividing plate (42; 142) a cylinder disposed substantially parallel to and at a slight distance from the inner surface of the bell (24; 124) is sealingly placed, whose height is less than the height of the interstice measured between the two dividing plates (42, 52; 142, 152), and that no perforations are provided in the annular area of the bottom dividing plate (42; 142) situated between the inner surface of the bell (24; 124) and the outer surface of the cylinder (50; 150).

3. Apparatus in accordance with claim 1 or 2 and provided as an absorber or resorber, characterized in that the tubes passing through the interstice between the dividing plates (42; 52) provided in the upper bell (24) have at least in their bottom end area an outside diameter that is smaller than the free inside diameter at the mouths of the tubes (22) projecting above the top plate (14), and that the tubes (54) passing through the interstice of the bell (24) are carried through the bottom perforated dividing plate (42) into the mouth area that is aligned with them of the tubes (22) projecting from the top plate (14).

4. Apparatus in accordance with claim 1 or 2, designed as a degasser or evaporator, characterized in that the upper bell (24) is provided in its area situated directly under the upper dividing plate (152) is provided with an additional outlet (156) which is connected by a conduit (158) to an additional connection (160) on the bottom bell (126).

5. Apparatus in accordance with claim 4, characterized in that the perforations (144) of small diameter provided in the dividing plate (142) open at their bottom into closely adjoining pipe nipples (145) which in turn open sealingly in an opening (149) in an additional horizontal dividing plate (147) which is disposed just above the plane of the vertical tubes (122) projecting above the horizontal top plate (114) between the dividing plate (142) and the top horizontal plate (114) of the pressure tank (112) and the said horizontal top plate, and which in turn is provided with through-openings (151) which are in line with the mouths of the vertical tubes (122) and whose admission cross section is slightly smaller than the free admission cross section of the vertical tubes (122), the through-openings being defined each by a collar (153) projecting from the dividing plate (147) into the mouth of the vertical tube (122) associated with it in each case.

6. Apparatus in accordance with claim 1 which serves for use in processes in which the absorption or degassing or the evaporation takes place at two or more different pressure levels, characterized in that, in the top and bottom bell (24, 26; 124, 126) at least two absorption or degassing systems or evaporating systems (a; b) hermetically sealed against one another and operating at the different pressure levels are disposed concentrically with one another such that the system (a) operating at lower pressure level concentrically surrounds the system (b) operating at higher pressure level.

* * * * *